(12) United States Patent
Zhou et al.

(10) Patent No.: US 10,590,240 B2
(45) Date of Patent: Mar. 17, 2020

(54) THERMOPLASTIC COMPOSITION WITH BALANCED CHEMICAL RESISTANCE AND IMPACT PROPERTIES

(71) Applicant: SABIC GLOBAL TECHNOLOGIES B.V., Bergen op Zoom (NL)

(72) Inventors: Hao Zhou, Newburgh, IN (US); Mark Adrianus Johannes van der Mee, Breda (NL); Roland Sebastian Assink, Middelburg (NL); Robert Dirk van de Grampel, Tholen (NL); Remco Wirtz, Bergen op Zoom (NL); Feng Cao, Loudonville, NY (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 222 days.

(21) Appl. No.: 15/737,951

(22) PCT Filed: Jun. 24, 2016

(86) PCT No.: PCT/US2016/039193
§ 371 (c)(1),
(2) Date: Dec. 19, 2017

(87) PCT Pub. No.: WO2017/003843
PCT Pub. Date: Jan. 5, 2017

(65) Prior Publication Data
US 2018/0215872 A1 Aug. 2, 2018

Related U.S. Application Data

(60) Provisional application No. 62/186,443, filed on Jun. 30, 2015.

(51) Int. Cl.
| | | |
|---|---|---|
| C08L 83/10 | (2006.01) |
| C08G 73/10 | (2006.01) |
| C08G 77/448 | (2006.01) |
| C08L 79/08 | (2006.01) |
| C08L 81/06 | (2006.01) |

(52) U.S. Cl.
CPC ..... *C08G 73/1053* (2013.01); *C08G 73/1071* (2013.01); *C08G 77/448* (2013.01); *C08L 79/08* (2013.01); *C08L 81/06* (2013.01); *C08L 83/10* (2013.01); C08L 2201/08 (2013.01); C08L 2203/206 (2013.01); C08L 2207/04 (2013.01)

(58) Field of Classification Search
None
See application file for complete search history.

(56) References Cited

U.S. PATENT DOCUMENTS

| | | |
|---|---|---|
| 6,255,483 B1 | 7/2001 | Fletcher et al. |
| 6,344,505 B1 | 2/2002 | Valentine, Jr. et al. |
| 8,937,127 B2 | 1/2015 | Sybert et al. |
| 9,006,319 B2 | 4/2015 | Gallucci et al. |
| 2003/0032755 A1 | 2/2003 | Gorny et al. |
| 2003/0096889 A1 | 5/2003 | Sarkar |
| 2006/0089433 A1 | 4/2006 | Hugi et al. |
| 2006/0207464 A1 | 9/2006 | Maljkovic et al. |
| 2009/0088514 A1* | 4/2009 | Shiping .............. C08L 69/00 524/451 |
| 2012/0251750 A1 | 10/2012 | Sybert et al. |
| 2013/0108852 A1 | 5/2013 | Kuhlman et al. |
| 2013/0150504 A1 | 6/2013 | Gallucci et al. |
| 2013/0150507 A1* | 6/2013 | Gallucci ............. C08L 81/06 524/132 |
| 2013/0178565 A1 | 7/2013 | Hennenberger et al. |
| 2013/0224462 A1 | 8/2013 | Van Der Mee et al. |
| 2014/0295363 A1 | 10/2014 | Sun et al. |
| 2017/0002177 A1 | 1/2017 | Narayanan et al. |
| 2018/0187011 A1 | 7/2018 | Zhou et al. |

FOREIGN PATENT DOCUMENTS

| | | |
|---|---|---|
| CN | 101434826 A | 5/2009 |
| EP | 0778077 A2 | 6/1997 |
| JP | 2001139812 A | 5/2001 |
| JP | 2001139813 A | 5/2001 |
| WO | 2009010537 A1 | 1/2009 |
| WO | 2013175448 A1 | 11/2013 |
| WO | 2014072923 A1 | 5/2014 |

OTHER PUBLICATIONS

BASF, The Chemical Company, "Tinuvin 360—Very low volatile benzotriazole UV absorber", Mar. 2011; 4 pages.
International Search Report for International Application No. PCT/US2016/039193, International Filing Date Jun. 24, 2016, dated Sep. 5, 2016, 5 pages.
Machine translated English language equivalent of JP 2001139812 (2001) 5 pages.
Machine translated English language equivalent of JP 2001139813 (2001) 5 pages.
Machine Translation of CN 101434826 (6 pages).
Machine Translation of JP 2001139813 (5 pages).
Polymer Database (Polysulfones. Polymer Properties Database. 2017) 3 pages.
Registry entry for RN 3147-75-9 (1984) 2 pages.
Weihai Jinwei Chem Industry (Ultraviolet absorber UV-328 2016, 1 page).
Written Opinion for International Application No. PCT/US2016/039193, International Filing Date Jun. 24, 2016, dated Sep. 5, 2016, 7 pages.
XP 55300964, "Technical Information on Tinuvin 234", BASF The Chemical Company, Aug. 1, 2010, 3 pages.

* cited by examiner

Primary Examiner — Robert S Loewe
(74) Attorney, Agent, or Firm — Cantor Colburn LLP

(57) ABSTRACT

A thermoplastic composition comprising, based on the total weight of the thermoplastic composition, 5 to 30 wt. % of a poly(arylene ether-sulfone); and 50 to 95 wt. % of a polycarbonate component comprising a poly(carbonate-siloxane) and optionally a polycarbonate homopolymer; wherein a sample of the composition has a notched Izod impact value of greater than or equal to 30 kJ/m$^2$; a tensile yield strength retention of 80% and higher after exposure of an ISO tensile bar for 24 hours to sunscreen under 0.5% strain compared to a non-exposed reference; and an elongation at break retention of 80% and higher after exposure of an ISO tensile bar for 24 hours to sunscreen under 0.5% strain compared to a non-exposed reference.

20 Claims, No Drawings

THERMOPLASTIC COMPOSITION WITH BALANCED CHEMICAL RESISTANCE AND IMPACT PROPERTIES

CROSS REFERENCE TO RELATED APPLICATIONS

This application is a National Stage application of PCT/US16/39193, filed Jun. 24, 2016, which claims the benefit of U.S. Provisional Application No. 62/186,443, filed Jun. 30, 2015, both of which are incorporated by reference in their entirety herein.

BACKGROUND

This disclosure is directed to thermoplastic compositions, articles formed therefrom, and their methods of manufacture, and in particular thermoplastic compositions with advantageous properties such as improved impact strength and chemical resistance.

Polycarbonates are useful in a wide variety of applications at least in part because of their good balance of properties, such as moldability, heat resistance and impact properties, among others. However, the performance of polycarbonates themselves may not be sufficient to meet application requirements on chemical resistance for certain applications. For example, in order to be used in mobile phones, materials have to pass environmental stress-cracking resistance (ESCR) testing at 0.5 or 1% strain after exposing to a sunscreen. Another important requirement is low temperature impact having ductility at temperatures of −10° C., −30° C. or lower, depending on the application and design.

Blending of polycarbonates with other polymers with good chemical resistance may improve the ESCR resistance of the polycarbonates, but the addition of the polymers such as poly(ethylene terephthalate) or polyetherimide results in poor impact performance. Since low temperature impact (ductility) is another key requirement, such materials would not be suitable for mobile phone applications.

Despite extensive research on these materials over the years, there still remains a need in the art for improved thermoplastic compositions that have balanced chemical resistance and low temperature impact properties.

SUMMARY

Disclosed herein is a thermoplastic composition comprising, based on the total weight of the thermoplastic composition, 5 to 30 wt. % of a poly(arylene ether-sulfone); and 50 to 95 wt. % of a polycarbonate component comprising a poly(carbonate-siloxane) and optionally a polycarbonate homopolymer; wherein a sample of the composition has a notched Izod impact value of greater than or equal to 30 kJ/m², measured at 23° C. according to ISO 180/1A using multipurpose 3.0 mm test specimen in accordance with ISO 3167 TYPE A; a tensile yield strength retention of 80% and higher after exposure of an ISO tensile bar for 24 hours to sunscreen under 0.5% strain compared to a non-exposed reference tested according to ISO 527; and an elongation at break retention of 80% and higher after exposure of an ISO tensile bar for 24 hours to sunscreen under 0.5% strain compared to a non-exposed reference tested according to ISO 527.

In another embodiment, an article selected from a molded article, a thermoformed article, an extruded film, an extruded sheet, a honeycomb structure, a foamed article, one or more layers of a multi-layer article, a substrate for a coated article, and a substrate for a metallized article comprises the above-described thermoplastic composition.

In yet another embodiment, a method of manufacture of an article comprises molding, extruding, or shaping the above-described thermoplastic composition into an article.

DETAILED DESCRIPTION

The inventors hereof have discovered thermoplastic compositions having a novel combination of properties. The compositions comprise a poly(arylene ether-sulfone), and a polycarbonate component comprising poly(carbonate-siloxane) and optionally a polycarbonate homopolymer. The compositions have excellent impact properties, particularly low temperature impact without using a compatibilizer.

In another embodiment, the compositions comprise a specific compatibilizer. The compatibilizer can be a poly(carbonate-arylate ester) or a poly(carbonate-arylate ester-siloxane). Use of these compounds as a compatibilizer allows the manufacture of compositions having an unexpectedly improved combination of properties, including excellent low temperature impact properties, improved elongation at break, and tensile strength retention after exposure to a variety of solvents.

The individual components of the compositions are described in more detail below.

A "poly(arylene ether-sulfone)" as used herein refers to polymers having a backbone of formula (1)

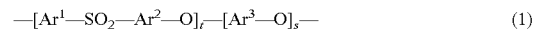

wherein t is greater than 1, and s is 0 or greater than one, and each $Ar^1$, $Ar^2$, and $Ar^3$ is the same or different, and is a group of formula (2)

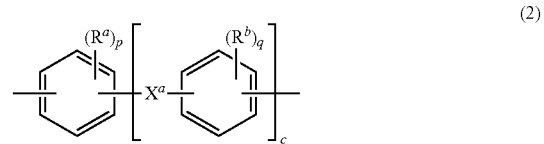

wherein c is 0 or 1, $R^a$ and $R^b$ are each independently a linear or branched $C_{1-10}$ alkyl, linear or branched $C_{2-10}$ alkenyl, linear or branched $C_{2-10}$ alkynyl, $C_{6-18}$ aryl, $C_{7-20}$ alkylaryl, $C_{7-20}$ arylalkyl, $C_{5-10}$ cycloalkyl, $C_{5-20}$ cycloalkenyl, linear or branched $C_{1-10}$ alkylcarbonyl, $C_{6-18}$ arylcarbonyl, halogen, nitro, cyano, a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (2), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, c is 0 or 1, p and q is each 0, and $X^a$ is isopropylidene.

Specific poly(arylene ether-sulfone)s that can be used include polyethersulfone (also known as "PES" or "PESU"), which contains at least 85 wt. % of units of formula (3)

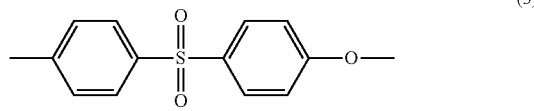
(3)

or polyphenylene sulfone (also known as "PPSU) of formula (4)

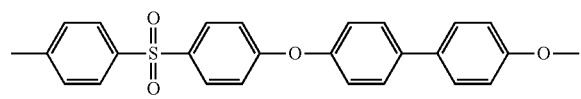
(4)

or polyetherethersulfone of formula (5)

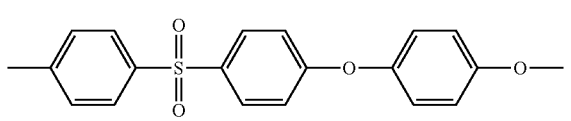
(5)

or polysulfone (often referred to as "PSU") of formula (6)

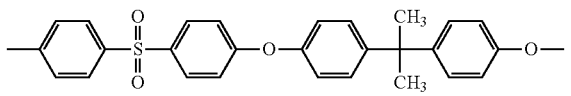
(6)

or a combination comprising at least one of the foregoing poly(arylene ether-sulfone)s. Copolymers comprising at least two units of formulas (3), (4), (5), and (6) can also be used.

The poly(arylene ether-sulfone)s can be linear or branched, having 1 or more, 2 or more, or 5 or more branching points per 1,000 carbon atoms along the polymer chain. In an embodiment, the poly(phenylsulfone)s are linear, having 10 or fewer, 5 or fewer, 2 or fewer, or 1 or fewer branching points per 1,000 carbon atoms along the polymer chain. In an embodiment, the poly(arylene ether-sulfone)s have a glass transition temperature (Tg) of greater than about 175° C., specifically from about 200° C. to about 280° C., and more specifically from about 255° C. to about 275° C. The poly(arylene ether-sulfone)s can further have a weight average molecular weight (Mw) of about 500 to about 100,000 grams/mole (g/mol), specifically about 1,000 to about 75,000 g/mol, more specifically about 1,500 to about 50,000 g/mol, and still more specifically about 2,000 to about 25,000 g/mol.

Exemplary poly(arylene ether-sulfone)s that can be used include those that are available from sources such as Solvay Specialty Polymers, Quadrant EPP, Centroplast Centro, Duneon, GEHR Plastics, Westlake Plastics, and Gharda Chemicals. Commercial grades of poly(phenylsulfone)s include those with the trade names RADEL, UDEL, ULTRASON, and GAFONE. Polyethersulfones are commercially available from Solvay Advanced Polymers K.K. under the trademark of VERADEL, from BASF Corporation under the trademark of ULTRASON, and from Sumitomo Chemical Co., Ltd. under the trademark of SUMIKA EXCEL.

The poly(carbonate-siloxane) ((also referred to as "PC-siloxane" or "PC-Si") are compounds comprising repeating carbonate units and repeating siloxane units. The carbonate units are preferably bisphenol carbonate units of formula (7)

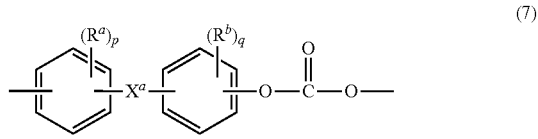
(7)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (specifically para) to each other on the $C_6$ arylene group.

In a specific embodiment, $R^a$ and $R^b$ are each independently a $C_{1-3}$ alkyl group, p and q are each independently 0 to 1, and $X^a$ is a single bond, —O—, —S(O)—, —S(O)$_2$—, —C(O)—, a $C_{1-9}$ alkylidene of formula —C($R^c$)($R^d$)— wherein $R^c$ and $R^d$ are each independently hydrogen or $C_{1-8}$ alkyl, or a group of the formula —C(=$R^e$)— wherein $R^e$ is a divalent $C_{1-9}$ hydrocarbon group. In another specific embodiment, $R^a$ and $R^b$ are each independently a methyl group, p and q are each independently 0 to 1, and $X^a$ is a single bond, a $C_{1-7}$ alkylidene of formula —C($R^c$)($R^d$)— wherein $R^c$ and $R^d$ are each independently hydrogen or $C_{1-6}$ alkyl. In an embodiment, p and q is each 1, and $R^a$ and $R^b$ are each a $C_{1-3}$ alkyl group, specifically methyl, disposed meta to the oxygen on each ring. The bisphenol carbonate units (1) can be derived from bisphenol A, where p and q are both 0 and $X^a$ is isopropylidene.

The polycarbonate units can be produced from dihydroxy compounds of the formula (8)

HO—R$^1$—OH (8)

wherein $R^1$ is a bridging moiety. The bisphenol carbonate units (7) are generally produced from the corresponding bisphenol compounds of formula (9)

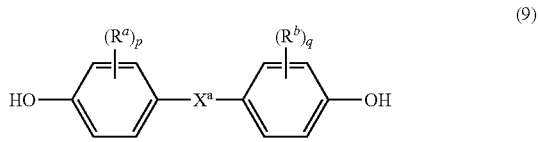
(9)

wherein $R^a$ and $R^b$, p and q, and $X^a$ are the same as in formula (7).

Some illustrative examples of specific bisphenol compounds that can be used to produce units (1) include 4,4'- dihydroxybiphenyl, bis(4-hydroxyphenyl)methane, 1,2-bis (4-hydroxyphenyl)ethane, 2-(4-hydroxyphenyl)-2-(3-hydroxyphenyl)propane, 1,2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, bis (4-hydroxyphenyl)ether, bis(4-hydroxyphenyl)sulfide, bis (4-hydroxyphenyl)sulfoxide, bis(4-hydroxyphenyl)sulfone, or a combination comprising at least one of the foregoing bisphenolic compounds.

Specific examples of bisphenol compounds that can be used in the production of bisphenol carbonate units (7) include 1,1-bis(4-hydroxyphenyl) methane, 1,1-bis(4-hydroxyphenyl) ethane, 2,2-bis(4-hydroxyphenyl) propane ("bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, and combinations comprising at least one of the foregoing bisphenol compounds.

The poly(carbonate-siloxane) copolymers further contain repeating siloxane units (also known as "diorganosiloxane units"). The siloxane units can be polysiloxane units of formula (10)

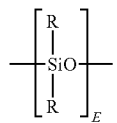

(10)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R groups can be used in the same copolymer. In an embodiment, the polysiloxane comprises R groups that have minimal hydrocarbon content. In a specific embodiment, an R group with a minimal hydrocarbon content is a methyl group.

The average value of E in formula (10) can vary widely depending on the type and relative amount of each component in the polycarbonate composition, whether the polymer is linear, branched or a graft copolymer, the desired properties of the composition, and like considerations. In an embodiment, E has an average value of 2 to 500, 2 to 200, or 5 to 120, 10 to 100, 10 to 80, 2 to 30, or 30 to 80. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 10. In an embodiment, the polysiloxane units are structural units of formula (10a)

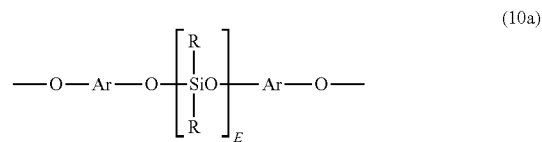

(10a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (10a) can be derived from a $C_{6-30}$ dihydroxy aromatic compound, for example a bisphenol compound as described above or a monoaryl dihydroxy compound. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl) methane, 1,1-bis (4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a specific embodiment, where Ar is derived from resorcinol, the polysiloxane units are of the formula (10a-1)

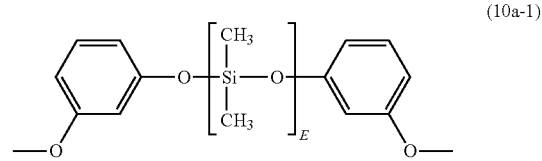

(10a-1)

or, where Ar is derived from bisphenol A, the polysiloxane has the formula (10a-2)

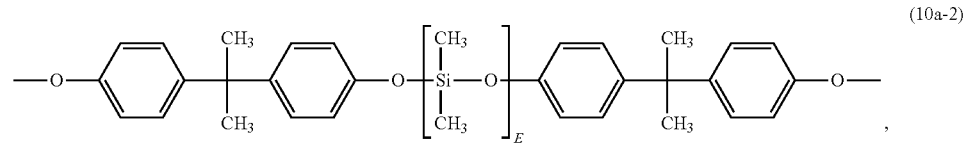

(10a-2)

or a combination comprising at least one of the foregoing can be used, wherein E has an average value as described above, specifically an average value of 2 to 200.

In another embodiment, polydiorganosiloxane units are units of formula (10b)

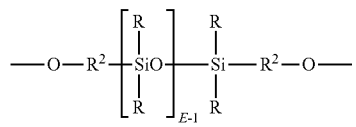

(10b)

wherein R and E are as described for formula (10), and each $R^2$ is independently a $C_{1-30}$ or $C_{2-14}$ hydrocarbylene group, for example, a divalent $C_{1-30}$ alkylene or $C_{7-30}$ arylene-alkylene. In a specific embodiment, where $R^2$ is $C_{7-30}$ arylene-alkylene, the polydiorganosiloxane units are of formula (10b-1)

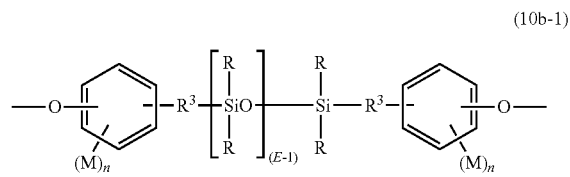

(10b-1)

wherein R and E are as defined for formula (10), and each $R^3$ is independently a divalent $C_{2-8}$ aliphatic group. Each M in formula (10b-1) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl. The foregoing poly(carbonate-siloxane) copolymers can be manufactured by the methods described in U.S. Pat. No. 6,072,011 to Hoover, for example.

In a specific embodiment, the polysiloxane units are eugenol-capped polysiloxane units of formula (10b-2)

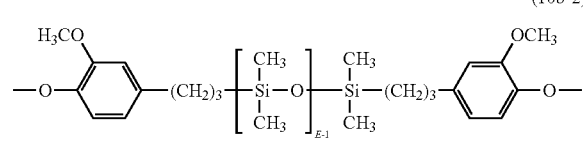

(10b-2)

where E has an average value as described above, specifically 2 to 200, 2 to 100, 2 to 90, 2 to 80, or 2 to 30, 20 to 20, or 30 to 80. In another specific embodiment, the polysiloxane units are of formula (10b-3) or (10b-4)

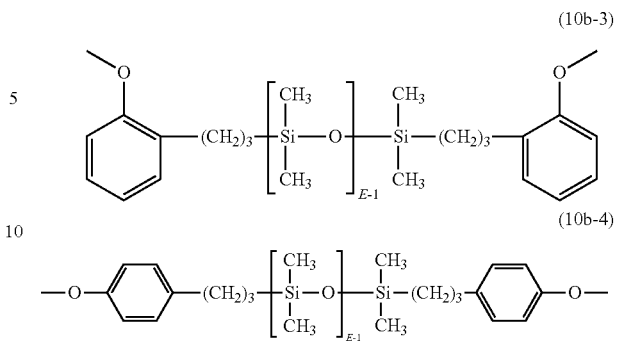

where E has an average value as defined above, specifically an average value of 2 to 200, 2 to 100, 2 to 90, 2 to 80, or 2 to 30, 20 to 20, or 30 to 80.

The relative amount of carbonate units (7) and polysiloxane units (10) in the PC-siloxane copolymers depends on the desired properties of the polycarbonate composition, such as impact, smoke density, heat release, and melt viscosity. In particular the polycarbonate copolymer is selected to have an average value of E that provides good impact and/or transparency properties, as well as to provide the desired weight percent of siloxane units in the polycarbonate composition. For example, the polycarbonate copolymers can comprise siloxane units in an amount of 0.1 to 60 weight percent (wt. %), specifically 0.5 to 55 wt. %, or 0.5 to 45 wt. %, based on the total weight of the polymers in the polycarbonate composition, with the proviso that the siloxane units are provided by polysiloxane units covalently bonded in the polymer backbone of the polycarbonate copolymer.

A specific PC-siloxane comprises carbonate units (7) derived from bisphenol A, and second repeating siloxane units (10b-2), (10b-3), (10b-4), or a combination comprising at least one of the foregoing, specifically (10b-2). This polycarbonate copolymer can comprise the siloxane units in an amount of 0.1 to 60 weight percent (wt. %), 0.5 to 55 wt. %, 0.5 to 45 wt. % 0.5 to 30 wt. %, or 0.5 to 20 wt. %, based on the total weight of the polycarbonate copolymer, with the proviso that the siloxane units are covalently bound to the polymer backbone of the polycarbonate copolymer. In an embodiment, the remaining units are bisphenol units (7). Transparency can be achieved in this embodiment when E has an average value of 4 to 50, 4 to 15, specifically 5 to 15, more specifically 6 to 15, and still more specifically 7 to 10. The transparent PC-siloxanes can be manufactured using one or both of the tube reactor processes described in U.S. Patent Application No. 2004/0039145A1 or the process described in U.S. Pat. No. 6,723,864 may be used to synthesize the poly(siloxane-carbonate) copolymers.

These and other methods for the manufacture of the PC-siloxane copolymers are known. The PC-siloxane copolymers can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, as measured by gel permeation chromatography (GPC) using a cross linked styrene-divinyl benzene column, at a sample concentration of 1 milligram per milliliter, and as calibrated with Bisphenol A polycarbonate standards.

Optionally, the thermoplastic composition comprises a homopolycarbonate. A polycarbonate homopolymer refers to a polymer comprising only one type of carbonate units of formula (7). In a specific embodiment, the polycarbonate homopolymer is a linear homopolymer comprising bisphenol A carbonate units.

Optionally, the thermoplastic composition comprises a compatibilizer component selected from a poly(carbonate-arylate ester) compatibilizer, a poly(carbonate-arylate ester-siloxane) compatibilizer, or a combination thereof.

A poly(carbonate-arylate ester) comprises repeating bisphenol carbonate units (7) and repeating arylate ester units of formula (11)

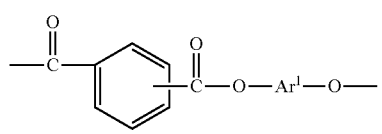

(11)

wherein $Ar^1$ is a $C_{6-32}$ hydrocarbyl group containing at least one aromatic group, e.g., a phenyl, naphthalene, anthracene, or the like. In an embodiment, $Ar^1$ is derived from an aromatic bisphenol as described above in connection with units (7), a monoaryl dihydroxy compound (12), or a combination comprising different bisphenol or monoaryl dihydroxy compounds, wherein formula (12) is

(12)

wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine. Thus, arylate ester units (11) can be derived by reaction of isophthalic acid, terephthalic acid, or a combination comprising at least one of the foregoing (referred to herein as a "phthalic acid"), with any of the aromatic bisphenols described above, a monoaryl dihydroxy compound (12), or a combination comprising at least one of the foregoing. The molar ratio of isophthalate to terephthalate can be 1:99 to 99:1, or 80:20 to 20:80, or 60:40 to 40:60.

The poly(carbonate-arylate ester) comprising bisphenol carbonate units (7) and arylate ester units (11) can be alternating or block copolymers of formula (13)

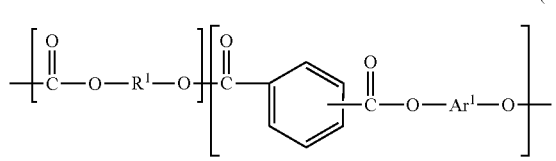

(13)

wherein $R^1$ and $Ar^1$ are as defined in formulae (7) and (11), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, specifically from 90:10 to 10:90, or more specifically from 90:10 to 50:50, depending on the desired properties of the polycarbonate composition. The molar ratio of isophthalate to terephthalate in the ester units of the copolymers can also vary broadly, for example from 0:100 to 100:0, or from 92:8 to 8:92, more specifically from 98:2 to 45:55, depending on the desired properties of the polycarbonate composition. For example, the weight ratio of total ester units to total carbonate can be 99:1 to 40:60, or 90:10 to 50:40, wherein the molar ratio of isophthalate to terephthalate is from 99:1 to 40:50, more specifically 98:2 to 45:55, depending on the desired properties of the polycarbonate composition.

Additional carbonate units derived from the dihydroxy compound used to form the arylate ester units (11) can also be present as described above, for example in amounts of less than 20 mole %, less than 10 mole %, or less than 5 mole %, based on the total moles of units in the polycarbonate copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and such additional arylate ester units are present in an amount of less than 20 mole %, less than 10 mole %, less than 5 mole %, or less than 1 mole % based on the total moles of units in the copolymer.

A specific poly(carbonate-arylate ester) is a poly(carbonate)-co-(bisphenol arylate ester) comprising carbonate units (7), specifically bisphenol carbonate units, even more specifically bisphenol A carbonate units and repeating bisphenol arylate ester units. Bisphenol arylate units comprise residues of phthalic acid and a bisphenol, for example a bisphenol (8) or (9). In an embodiment the bisphenol arylate ester units are of formula (11a)

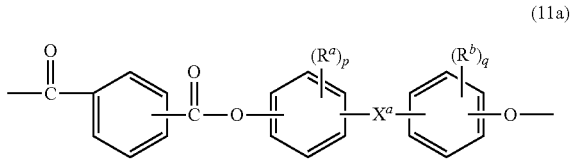

(11a)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. In an embodiment, p and q is each 0 or 1, and $R^a$ and $R^b$ are each a $C_{1-3}$ alkyl group, specifically methyl, disposed meta to the oxygen on each ring, and $X^a$ is an alkylidene of the formula —C($R^c$)($R^d$)— wherein $R^c$ and $R^d$ are each $C_{1-6}$ alkyl. The bisphenol can be bisphenol A, where p and q are both 0 and $X^a$ is isopropylidene.

In a specific embodiment, the poly(carbonate-arylate ester) is a poly(bisphenol A carbonate)-co-(bisphenol A-phthalate-ester) of formula (13a)

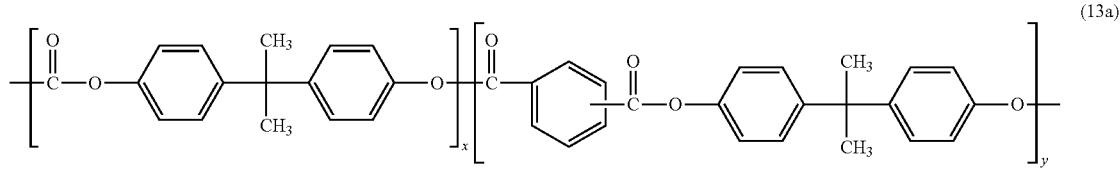

wherein y and x represent the weight percent of arylate-bisphenol A ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (13a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE), and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a specific poly(carbonate-arylate ester) is a poly(carbonate)-co-(monoaryl arylate ester) containing carbonate units (7) and repeating monoaryl arylate ester units of formula (11b)

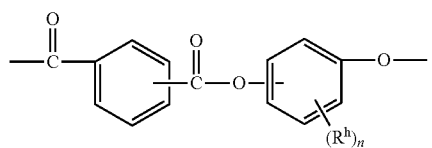

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate)-co-(monoaryl arylate ester) copolymers are of formula (13b)

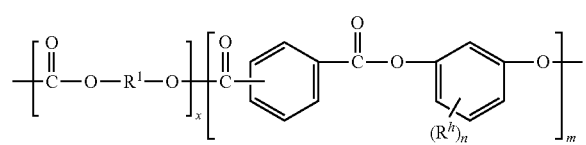

wherein $R^1$ is as defined in formula (7) and $R^h$, and n are as defined in formula (11b), and the mole ratio of x:m is 99:1 to 1:99, specifically 80:20 to 20:80, or 60:40 to 40:60.

Specifically, the monoaryl-arylate ester unit (11b) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (11c)

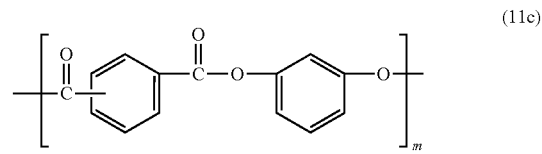

wherein m is 4 to 100, 4 to 90, 5 to 70, more specifically 5 to 50, or still more specifically 10 to 30. In an embodiment, the ITR ester units are present in the polycarbonate copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

A specific example of a poly(carbonate)-co-(monoaryl arylate ester) is a poly(bisphenol A carbonate)-co-(isophthalate-terephthalate-resorcinol ester) of formula (13c)

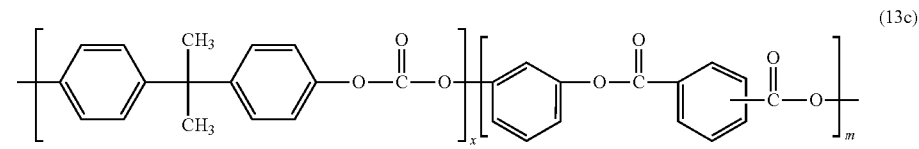

wherein m is 4 to 100, 4 to 90, 5 to 70, more specifically 5 to 50, or still more specifically 10 to 30, and the mole ratio of x:n is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination comprising at least one of the foregoing can be present, in a total amount of 1 to 20 mole % based on the total moles of units in the copolymers, for example resorcinol carbonate units of formula (14) and bisphenol ester units of formula (11a):

(14)

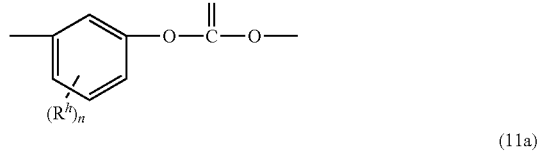

(11a)

wherein, in the foregoing formulae, R is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —S(O)_2—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group. The bisphenol ester units can be bisphenol A phthalate ester units of the formula

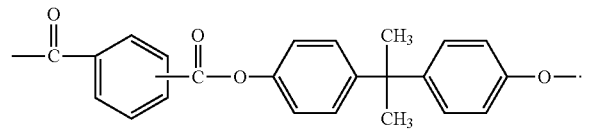

In an embodiment, poly(bisphenol A carbonate)-co-(isophthalate-terephthalate-resorcinol ester) (13c) comprises 1 to 20 mol % of bisphenol A carbonate units, 60 to 99 mol % of isophthalic acid-terephthalic acid-resorcinol ester units, and optionally 1 to 20 mol % of resorcinol carbonate units, isophthalic acid-terephthalic acid-bisphenol A phthalate ester units, or a combination comprising at least one of the foregoing. In another embodiment, poly(bisphenol A carbonate)-co-(isophthalate-terephthalate-resorcinol ester) (13c) 70 to 90 mol % of bisphenol A carbonate units, 10 to 30 mol % of isophthalic acid-terephthalic acid-resorcinol ester units, and optionally, 1 to 60 mol % resorcinol carbonate units, isophthalic acid-terephthalic acid-bisphenol A ester units, or a combination thereof.

A poly(carbonate-arylate ester-siloxane) further comprises siloxane units (also known as "diorganosiloxane units"). In a specific embodiment these copolymers comprises carbonate units (7) derived from a bisphenol (9), specifically bisphenol-A; monoaryl arylate ester units (11b), and siloxane units. Still more specifically, the poly(carbonate-arylate ester-siloxane) comprises bisphenol-A carbonate units, ITR ester units (11c), and siloxane units (10). For convenience, these polymers, poly(bisphenol-A carbonate)-co-poly(isophthalate-terephthalate-resorcinol ester)-co-poly(siloxane), are referred to herein as "ITR-PC-siloxane" copolymers.

The relative amount of polysiloxane units (10) in the ITR-PC-siloxane copolymers depends on the desired properties of the thermoplastic composition, such as impact, and melt viscosity. In particular the poly(carbonate-arylate ester) is selected to have an average value of E that provides good impact and/or transparency properties, as well as to provide the desired weight percent of siloxane units in the thermoplastic composition. For example, the poly(carbonate-arylate ester)s can comprise siloxane units in an amount of 0.3 to 30 weight percent (wt. %), specifically 0.5 to 25 wt. %, or 0.5 to 15 wt. %, based on the total weight of the polymers in the thermoplastic composition, with the proviso that the siloxane units are provided by polysiloxane units covalently bonded in the polymer backbone of the poly(carbonate-arylate ester).

In an embodiment, the PC-ITR-siloxane copolymers comprise 1 to 40 mol %, or 1 to 20 mol % of bisphenol-A carbonate units, 50 to 95 mol % of ITR ester units (11c), and an amount of polysiloxane units (10b), specifically (10b-1), even more specifically (10b-2), (10b-3), (10b-4) or a combination comprising at least one of the foregoing (specifically of formula 10b-2) in an amount effective to provide 0.1 to 10 wt. % of siloxane units, each based on the total copolymer. For example, the PC-ITR-siloxane copolymers can comprise 1 to 20 mol % of bisphenol-A carbonate units, 60 to 90 mole % of ITR ester units, and an amount of polysiloxane units (10b-2), (10b-3), (10b-4) or a combination comprising at least one of the foregoing (specifically of formula 10b-2) effective to provide 0.1 to 10 wt. % of siloxane units, each based on the total copolymer.

The polycarbonate copolymers comprising arylate ester units are generally prepared from polyester blocks. The polyester blocks can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The polycarbonate copolymers comprising arylate ester units can have an $M_w$ of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with bisphenol A polycarbonate standards. Samples are eluted at a flow rate of about 1.0 ml/min with methylene chloride as the eluent.

An end-capping agent (also referred to as a chain stopper agent or chain terminating agent) can be included during polymerization to provide end groups. The end-capping agents (and thus end groups) are selected based on the desired properties of the polycarbonates. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used.

Optionally, the thermoplastic composition further comprises a polyetherimide, and can have good impact. For example the thermoplastic composition can comprise a poly(arylene ether-sulfone); a polycarbonate component comprising a poly(carbonate-siloxane) and optionally a polycarbonate homopolymer; and a polyetherimide. Polyetherimides are known in the art, and are described for example in U.S. Pat. No. 9,006,319, in WO 2009/10537, and in U.S. Pat. No. 8,937,127. In a specific embodiment the polyetherimide comprises units comprising bisphenol A moieties and moieties derived from p-phenylene diamine, m-phenylene diamine, sulfonyl dianiline, chemical equivalents of the foregoing diamines, or a combination comprising at least one of the foregoing diamines. The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 1,000 to 150,000 grams/mole (Dalton), or 10,000 to 80,000 Daltons as measured by gel permeation chromatography, using polystyrene standards. Such polyetherimide polymers can have an intrinsic viscosity greater than 0.2 deciliters per gram (dl/g), or, more specifically, 0.35 to 0.7 dl/g as measured in m-cresol at 25° C.

When a polyetherimide is present, the thermoplastic composition can comprise 5 to 30 wt. % of a poly(arylene ether-sulfone); 50 to 95 wt. % of a polycarbonate component comprising a poly(carbonate-siloxane) and optionally a polycarbonate homopolymer; and 0.5 to 25 wt. % of the polyetherimide. These thermoplastic composition can have a notched Izod impact value of greater than or equal to 30 $kJ/m^2$, measured at 23° C. according to ISO 180/1A using multipurpose 3.0 mm test specimen in accordance with ISO 3167 TYPE A. The compositions can also have a tensile yield strength retention of 80% and higher after exposure of an ISO tensile bar for 24 hours to sunscreen under 0.5% strain compared to a non-exposed reference tested according to ISO 527; and an elongation at break retention of 80% and higher after exposure of an ISO tensile bar for 24 hours to sunscreen under 0.5% strain compared to a non-exposed reference tested according to ISO 527.

The thermoplastic compositions can include various other polymers to adjust the properties of the thermoplastic compositions, with the proviso that the other polymers are selected so as to not adversely affect the desired properties of the thermoplastic composition significantly, in particular low smoke density and low heat release. Other polymers include an impact modifier such as natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like can be present. In general such other polymers provide less than 50 wt. %, less than 40 wt. %, less than 30 wt. %, less than 20 wt. %, or less than 10 wt. % of the total composition. In an embodiment, no other polymers are present. In a specific embodiment, no polymers containing halogen are present in the thermoplastic compositions.

Methods for forming the thermoplastic compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. The thermoplastic compositions can be foamed, extruded into a sheet, or optionally pelletized. Methods of foaming a thermoplastic composition using frothing or physical or chemical blowing agents are known and can be used. The pellets can be used for molding into articles, foaming, or they can be used in forming a sheet of the flame retardant thermoplastic composition. In some embodiments, the composition can be extruded (or co-extruded with a coating or other layer) in the form of a sheet and/or can be processed through calendaring rolls to form the desired sheet.

As discussed above, the thermoplastic compositions are formulated to achieve an improved combination of properties, including excellent impact properties, improved elongation at break, and tensile strength retention after exposure to a variety of solvents. The relative amounts of poly(arylene ether-sulfone), poly(carbonate-siloxane), and the optional compatibilizer in the thermoplastic compositions depend on the particular polymers, the targeted impact and chemical resistance.

The thermoplastic compositions can further have excellent impact properties, in particular Izod notched impact and ductility. The compositions can have an Izod notched impact energy of at least at least 30 $kJ/m^2$, 40 $kJ/m^2$, at least 50 $kJ/m^2$ or at least 60 $kJ/m^2$ measured at 23° C. according to ISO 180/1A using multipurpose 4.0 mm or 3.0 mm test specimen in accordance with ISO 3167 TYPE A. The compositions can have greater than 80% ductility measured at 23 to 0° C., according to ISO 180/1A using multipurpose 4.0 mm or 3.0 mm test specimen in accordance with ISO 3167 TYPE A. These values can be obtained in articles having a wide range of thicknesses, for example from 0.1 to 10 mm, or 0.5 to 5 mm. In some embodiments, the composition can have an Izod notched impact equal to or higher than 30 kJ/m² or 40 kJ/m² and a high ductility (80% or greater, for example 100%) at lower temperatures such as 10° C., 0° C., −10° C., −20° C., −30° C., and −50° C.

The thermoplastic compositions can further have a Notched Izod Impact (NII) of 350 to 800 Joules per meter, J/m, or 400 to 700 J/m, measured at 23° C. using ⅛-inch thick bars (3.18 mm) in accordance with ASTM D256-2010.

The thermoplastic compositions can further have a ductility of 50 to 100%, or 80 to 100%, measured in accordance with ASTM 256-2010.

The thermoplastic compositions can have a tensile yield stress retention of 80% or higher after exposure of an ASTM tensile bar for 24 hours at 23° C. to sunscreen under 0.5% strain as measured by ASTM D256.

The thermoplastic composition can also have a tensile yield strength retention of 80% and higher after exposure of an ISO tensile bar for 24 hours to sunscreen under 0.5% strain compared to a non-exposed reference tested according to ISO 527; and an elongation at break retention of 80% and higher after exposure of an ISO tensile bar for 24 hours to sunscreen under 0.5% strain compared to a non-exposed reference tested according to ISO 527.

Shaped, formed, or molded articles comprising the thermoplastic compositions are also provided. The thermoplastic compositions can be molded into useful shaped articles by a variety of means such as injection molding, extrusion, rotational molding, blow molding, and thermoforming to form articles. Thus the thermoplastic compositions can be used to form a foamed article, a molded article, a thermoformed article, an extruded film, an extruded sheet including an extruded multiwall sheet, a honeycomb structure, one or more layers of a multi-layer article (e.g. a cap-layer), a substrate for a coated article, or a substrate for a metallized article.

Illustrative articles include components for consumer electronics, wherein the component is a housing, a frame, a clip, a bezel, a bushing, a flange, a strut, a prong, a fin, or a rib. By consumer electronics device (CED) is meant a cellular phone (e.g., a smartphone), a tablet computer, a laptop computer, a portable media player, a television, a portable gaming device, a gaming console, a gaming controller, a remote control, an appliance (e.g. a toaster, a refrigerator, a bread maker, a microwave, a vacuum cleaner, etc.) a power tool (a drill, a blender, etc.), a robot (e.g. an autonomous cleaning robot, a care giving robot, etc.), a toy (e.g. a doll, a figurine, a construction set, a tractor, etc.), a greeting card, a home entertainment system, an active loudspeaker, a soundbar, or the like.

Illustrative articles also include interior components for a train or aircraft, wherein the component is selected from a partition, a room divider, a seat back, a food tray, a trim panel, an interior display panel, an interior wall, a side wall, an end wall, a ceiling panel, a door lining, a flap, a box, a hood, a louver, an insulation material, a handle, a body shell for a window, a window frame, an enclosure for an electronic device, a door, a luggage rack, a luggage container, an interior side of a gangway membrane, an interior lining of a gangway, or a component of a luggage compartment, a display unit, a television, a refrigerator door, a tray table, a food cart, a magazine rack, an air flow regulator, a door, a table, or a seat.

The thermoplastic compositions are further illustrated by the following non-limiting examples.

EXAMPLES

Materials for the following examples are listed in Table 1. Amounts of each component in the Examples are in wt. %, based on the total weight of the composition, unless otherwise indicated.

TABLE 1

| ITEM | CHEMICAL DESCRIPTION | SOURCE |
|---|---|---|
| PC | Bisphenol-A polycarbonate, manufactured by interfacial polymerization, Mw = 28,000 to 32,000 g/mol (determined via GPC using BPA polycarbonate standards), manufactured by interfacial polymerization | SABIC |
| PC-Si | PDMS (polydimethylsiloxane) - bisphenol A copolymer, 6 mol % siloxane, having an average block length of 40-50 units, Mw 23,000 g/mol (determined via GPC using BPA polycarbonate standards), manufactured by interfacial polymerization | SABIC |
| PEI | Poly(etherimide) made via reaction of bisphenol-A dianhydride with equimolar amount of m-phenylene diamine, Mw = 31,000 to 35,000 g/mol (determined via GPC using polystyrene standards) | SABIC |
| PC-Ester | Poly(phthalate-carbonate) copolymer, 81 mol % ester, molecular weight = 28,500 g/mol (determined via GPC using BPA polycarbonate standards), manufactured via interfacial polymerization | SABIC |
| ITR-PC 2 | ITR (Isophthalic acid-terephthalic acid-resorcinol) - bisphenol A copolyestercarbonate copolymer, ITR content 19 mol %, Mw 29,000 to 31,000 g/mol, (determined via GPC using BPA polycarbonate standards), manufactured via interfacial polymerization | SABIC |
| ITR-PC-Si | Polysiloxane-ITR (Isophthalic acid-terephthalic acid-resorcinol) - bisphenol-A copolyestercarbonate copolymer, ester content 83 mol %, siloxane content 1 wt % (average siloxane chain length about 10), interfacial polymerization, Mw about 24,500 g/mol, para-cumyl phenol end-capped | SABIC |
| PPSU | Radel R5 100, polyphenylene sulphone | Solvay |
| PES | Polyethersulfone (Veradel 3100) | Solvay |
| AO | Tris(2,4-di-(tert)-butylphenyl)phosphite (Irgaphos 168) | Ciba |

The tests performed are summarized in Table 2.

TABLE 2

| Description | Test | Specimen | Property | Units |
|---|---|---|---|---|
| Izod Notched Impact, 5.5 J, various temperatures | ISO 180/1A | Multi-purpose ISO 3167 Type A, 3 mm thick | INI 3 mm | kJ/m² |

TABLE 2-continued

| Description | Test | Specimen | Property | Units |
|---|---|---|---|---|
| Izod Notched Impact, 5.5 J, various temperatures | ISO 180/1A | Multi-purpose ISO 3167 Type A, 4 mm thick | INI 4 mm | kJ/m$^2$ |
| ASTM Izod Notched Impact, various temperatures | ASTM D256-2010 | ASTM Impact bar, 3.2 mm thick | ASTM INI | J/m |
| Yield stress retention | ISO 527 | ISO Tensile bar | YS % | % |
| Elongation to break retention | ISO 527 | ISO Tensile bar | EB % | % |
| Tensile strength at yield retention | ASTM D638 | ASTM Tensile bar | | % |

ISO chemical resistance tests were performed according to the following protocol. ISO tensile bars were placed in jigs to bring them under 0.5% or 1% strain. While holding two Q-tips together, ~1 ml of chemical is applied to the specimen, where the chemical is spread in a circular motion around the center section and out toward the ends of the specimen until it reaches 25 mm in length. Any extra chemical that is on the sides of the bars is wiped off. Bars in the jigs are left for 24 hrs or 120 hrs at room temperature. After exposure, bars are conditioned for 24 hrs at room temperature and 50% relative humidity, and tested for tensile testing. The retention of yield stress and elongation to break is calculated compared to the reference sample that did not undergo the chemical exposure step.

ASTM chemical resistance tests were performed by soaking the ASTM tensile bars in chemicals for predefined exposure conditions. After exposure, bars were conditioned for 24 hrs at room temperature and 50% relative humidity, and were tested for strength retention before and after chemical exposure using the same ASTM D638. The retention of yield stress (tensile stress at yield) and elongation to break (nominal strain at break) is calculated compared to the reference sample that did not undergo the chemical exposure step.

Blending, Extrusion and Molding Conditions.

The compositions were made as follows. All solid additives (e.g., stabilizers, colorants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid flame retardants (e.g., BPADP), when used, were fed before the vacuum using a liquid injection system. It will be recognized by one skilled in the art that the method is not limited to these temperatures or processing equipment.

Extrusion of all materials was performed on a 25 mm Werner-Pfleiderer ZAK twin-screw extruder (L/D ratio of 33:1), with a vacuum port located near the die face. The extruder has 9 zones, which were set at temperatures of 40° C. (feed zone), 200° C. (zone 1), 250° C. (zone 2), 280° C. (zone 3), and 290-310° C. (zone 4 to 8). Screw speed was 300 rpm and throughput was between 15 and 25 kg/hr.

The compositions were molded after drying at 100-110° C. for 6 hours on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

Examples 1-5

These examples compare the impact properties and chemical resistance of compositions containing PC-Si and PEI or PPSU. Formulations and results are shown in Table 3.

The results show that PC-Si (CEx1) has good impact properties, even at temperatures as low as −30° C., with ASTM IZOD impact>400 J/m and ISO IZOD impact energy>30 kJ/m$^2$ at −30° C. However, PC-Si does not have a good resistance against sunscreen with significant loss in tensile strength and elongation to break retention after 24 hr exposure at 0.5% strain, with values of 20% retention or less.

The addition of 10% of high heat polymers like PEI (CEx2) or PPSU (Ex3) to PC-Si can result in significant improvements in chemical resistance, as for both the retention of tensile strength and elongation to break are much higher and exceeding 80% retention compared to the non-exposed reference. However, the addition of PEI results in significant loss in impact properties, with low values indicating brittle performance already at room temperature with ASTM IZOD impact<300 J/m and ISO IZOD impact energy<30 kJ/m$^2$ at +23° C. On the other hand, surprisingly, the impact properties are retained well for PPSU addition, with ASTM IZOD impact>500 J/m and ISO IZOD impact energy>45 kJ/m$^2$ at +23° C., and even at low temperatures with ASTM IZOD impact>400 J/m and ISO IZOD impact energy>30 kJ/m$^2$ at −30° C.

Same effects are achieved for 25% addition of PEI (CEx4) or PPSU (Ex5), with both having good retention of tensile strength and elongation to break close to 100% retention compared to the non-exposed reference. However, the addition of PEI results in significant loss in impact properties, with low values indicating brittle performance already at room temperature with ASTM IZOD impact<100 J/m and ISO IZOD impact energy<10 kJ/m$^2$ at +23° C. On the other hand, surprisingly, the impact properties are retained well for PPSU addition, with ASTM IZOD impact>400 J/m and ISO IZOD impact energy>40 kJ/m$^2$ at +23° C., and even at low temperatures with ASTM IZOD impact>200 J/m and ISO IZOD impact energy>30 kJ/m$^2$ at −10° C.

TABLE 3

| COMPONENTS | | CEx1 | CEx2 | Ex3 | CEx4 | Ex5 |
|---|---|---|---|---|---|---|
| PC-Si | % | 100 | 90 | 90 | 75 | 75 |
| Irgafos 168 | % | 0.1 | 0.1 | 0.1 | 0.1 | 0.1 |

TABLE 3-continued

| COMPONENTS | | CEx1 | CEx2 | Ex3 | CEx4 | Ex5 |
|---|---|---|---|---|---|---|
| PEI | % | | 10 | | 25 | |
| PPSU | % | | | 10 | | 25 |
| PROPERTIES | | | | | | |
| IZOD ISO 3 mm RT energy | kJ/m2 | 54 | 27 | 46 | 10 | 42 |
| IZOD ISO 3 mm 10° C. energy | kJ/m2 | 55 | 23 | 46 | 9 | 39 |
| IZOD ISO 3 mm 0° C. energy | kJ/m2 | 53 | 19 | 43 | 9 | 37 |
| IZOD ISO 3 mm −10° C. energy | kJ/m2 | 49 | 18 | 41 | 10 | 33 |
| IZOD ISO 3 mm −30° C. energy | kJ/m2 | 40 | 16 | 31 | 8 | 20 |
| IZOD ISO 3 mm −50° C. energy | kJ/m2 | 17 | 14 | 17 | 9 | 16 |
| IZOD ASTM RT energy | J/m | 719 | 260 | 591 | 96 | 401 |
| IZOD ASTM 10° C. energy | J/m | 660 | 225 | 539 | 92 | 413 |
| IZOD ASTM 0° C. energy | J/m | 673 | 199 | 535 | 91 | 424 |
| IZOD ASTM −10° C. energy | J/m | 663 | 181 | 531 | 92 | 226 |
| IZOD ASTM −30° C. energy | J/m | 595 | 169 | 472 | 90 | 265 |
| IZOD ASTM −50° C. energy | J/m | 206 | 147 | 247 | 92 | 200 |
| Tensile modulus | MPa | 2035 | 2104 | 2054 | 2244 | 2096 |
| Stress at Yield | MPa | 57 | 58 | 58 | 60 | 58 |
| Stress at Break | MPa | 55 | 52 | 52 | 52 | 58 |
| Strain at Yield | % | 6 | 5 | 6 | 5 | 5 |
| Strain at Break | % | 104 | 66 | 83 | 32 | 94 |
| Sunscreen, 0.5% strain, 24 hr, TS % (ISO) | % | 20 | 100 | 100 | 100 | 100 |
| Sunscreen, 0.5% strain, 24 hr, EB % (ISO) | % | 18 | 134 | 80 | 97 | 94 |

Examples 6-7

Examples 6-7 demonstrate the effect of the addition of PPSU or PES to the thermoplastic compositions containing a poly(carbonate-siloxane) (PC-Si). Formulations and results are shown in Table 4. In the chemical resistance tests, samples were exposed at 23° C. for 24 hours.

TABLE 4

| | | Ex6 | Ex7 |
|---|---|---|---|
| COMPONENT (Wt. %) | | | |
| PC-Si | | 84.9 | 84.9 |
| Phosphite | | 0.10 | 0.10 |
| PPSU | | 15.0 | — |
| PES | | — | 15.0 |
| PROPERTIES | | | |
| Modulus of Elasticity-Avg (MPa) | | 2178 | 2204 |
| Tensile Strength at Yield-Avg (MPa) | | 56.7 | 56.5 |
| Tensile Strength at Break-Avg (MPa) | | 52.3 | 50.1 |
| % Elongation at Yield-Avg (%) | | 5.5 | 5.4 |
| % Elongation at Break-Avg (%) | | 93.7 | 93.9 |
| Nominal Strain at Break-Avg (%) | | 62.6 | 60.9 |
| Notched Izod Ductility (%) | | 100 | 100 |
| ASTM INI (23° C.) Impact Strength-Avg (J/m) | | 633 | 412 |
| CHEMICAL RESISTANCE (ASTM) | | | |
| 0.5% strain sunscreen* | Tensile strength at yield retention % | 101 | 101 |
| | Nominal strain at break retention % | 88 | 37 |
| 1% strain; sunscreen | Tensile strength at yield retention % | 0 | 0 |
| | Nominal strain at break retention % | 0 | 0 |
| 0.5% strain; oleic acid | Tensile stress at yield retention % | 100 | 100 |
| | Nominal strain at break retention % | 72 | 33 |
| 1% strain oleic acid | Tensile stress at yield retention % | 0 | 0 |
| | Nominal strain at break retention % | 0 | 0 |
| 0.5% strain olive oil | Tensile stress at yield retention % | 0 | 100 |
| | Nominal strain at break retention % | 0 | 25 |
| 1% strain olive oil | Tensile stress at yield retention % | 0 | 0 |
| | Nominal strain at break retention % | 0 | 0 |
| 0.5% strain; countertop cleaner | Tensile stress at yield retention % | 0 | 0 |
| | Nominal strain at break retention % | 7 | 0 |
| 0.5% strain; sebum | Tensile stress at yield retention % | 100 | 100 |
| | Nominal strain at break retention % | 41 | 34 |
| 1% strain; sebum | Tensile stress at yield retention % | 0 | 0 |
| | Nominal strain at break retention % | 0 | 0 |

*Banana Boat ® SPF
** Fantastik ® cleaner

The results in Table 4 further demonstrate that two-component compositions with a poly(carbonate-siloxane) and either PPSU or PES (Ex6 and Ex7) have excellent notched Izod impact (>400 J/m) without using any compatibilizer.

Examples 8-9

The results in Table 5 indicate that good impact properties can also be achieved if a blend of PC-Si and PC homopolymer is used in combination with PPSU.

TABLE 5

|  | CEx8 | Ex9 |
|---|---|---|
| COMPONENTS (Wt. %) | | |
| PEI | 20 | |
| PPSU | | 20 |
| PC | 40.0 | 40 |
| PC-Si | 40.0 | 40 |
| PROPERTIES | | |
| INI, +23° C., 5.5 J (kJ/m$^2$) | 15 | 66 |
| INI, +23° C., Ductility % | 0 | 100 |
| INI, −10° C., 5.5 J (kJ/m$^2$) | 17 | 62 |
| INI, −10° C., Ductility (%) | 0 | 100 |
| INI, −30° C., 5.5 J (kJ/m$^2$) | 16 | 53 |
| INI, −30° C., Ductility (%) | 0 | 100 |

Examples 10-12

The results in Table 6 indicate that the impact performance of the composition containing PPSU and PC-Si (Ex10) can be further improved by adding copolymers like ITR-PC-Si and PC-Ester to the composition, as evidenced by the higher impact energy at room temperature for Ex 11 and Ex12 (>500 J/m) vs. around 400 J/m for the composition of Ex10, and the higher energy at −10° C. with ASTM IZOD impact>350 J/m for Ex11 and Ex12 compared to 226 for Ex 10.

TABLE 6

|  |  | Ex10 | Ex11 | Ex12 |
|---|---|---|---|---|
| COMPONENTS | | | | |
| PC-Si | % | 75 | 58.3 | 58.3 |
| ITR-PC-Si | % | | 16.7 | |
| PC-Ester | % | | | 16.7 |
| AO | % | 0.1 | 0.1 | 0.1 |
| PPSU | % | 25 | 25 | 25 |
| PROPERTIES | | | | |
| IZOD ASTM RT energy | J/m | 401 | 571 | 524 |
| IZOD ASTM 10° C. energy | J/m | 413 | 558 | 513 |
| IZOD ASTM 0° C. energy | J/m | 424 | 463 | 473 |
| IZOD ASTM −10° C. energy | J/m | 226 | 380 | 447 |
| IZOD ASTM −30° C. energy | J/m | 265 | 296 | 293 |
| IZOD ASTM −50° C. energy | J/m | 200 | 229 | 228 |

The compositions, methods, and articles are further illustrated by the following embodiments.

Embodiment 1

A thermoplastic composition comprising, based on the total weight of the thermoplastic composition, 5 to 30 wt. % or 10 to 25 wt. % of a poly(arylene ether-sulfone); and 50 to 95 wt. %, 70 to 95 wt. %, or 75 to 90 wt. % of a polycarbonate component comprising a poly(carbonate-siloxane) and optionally a polycarbonate homopolymer; wherein a sample of the composition has a notched Izod impact value of greater than or equal to 30 kJ/m$^2$, measured at 23° C. according to ISO 180/1A using multipurpose 3.0 mm test specimen in accordance with ISO 3167 TYPE A; a tensile yield strength retention of 80% and higher after exposure of an ISO tensile bar for 24 hours to sunscreen under 0.5% strain compared to a non-exposed reference tested according to ISO 527; and an elongation at break retention of 80% and higher after exposure of an ISO tensile bar for 24 hours to sunscreen under 0.5% strain compared to a non-exposed reference tested according to ISO 527.

Embodiment 2

The composition of embodiment 1, comprising, based on the total weight of the composition: 5 to 30 wt. % of a poly(arylene ether-sulfone); 50 to 90 wt. % of a polycarbonate component comprising a poly(carbonate-siloxane) and optionally a polycarbonate homopolymer; and 5 to 25 wt. %, 10 to 20 wt. %, or 15 to 20 wt. % of a of a poly(carbonate-arylate ester) compatibilizer, a poly(carbonate-arylate ester-siloxane) compatibilizer, or a combination comprising at least one of the foregoing.

Embodiment 3

The composition of embodiment 1 or 2, wherein the poly(arylene ether-sulfone) is of formula —[Ar$^1$—SO$_2$—Ar$^2$—O]—[Ar$^3$—O]$_s$— wherein t is greater than 1, and s is 0 or greater than one, and each Ar$^1$, Ar$^2$, and Ar$^3$ is the same or different, and is a group of formula (2) wherein c is 0 or 1, R$^a$ and R$^b$ are each independently a linear or branched C$_{1-10}$ alkyl, linear or branched C$_{2-10}$ alkenyl, linear or branched C$_{2-10}$ alkynyl, C$_{6-18}$ aryl, C$_{7-20}$ alkylaryl, C$_{7-20}$ arylalkyl, C$_{5-10}$ cycloalkyl, C$_{5-20}$ cycloalkenyl, linear or branched C$_{1-10}$ alkylcarbonyl, C$_{6-18}$ arylcarbonyl, halogen, nitro, cyano, a halogen, C$_{1-12}$ alkoxy, or C$_{1-12}$ alkyl, p and q are each independently integers of 0 to 4, and X$^a$ is a single bond, —O—, —S—, —S(O)—, —S(O)$_2$—, —C(O)—, or a C$_{1-18}$ organic group.

Embodiment 4

The composition of embodiment 3, wherein the poly(arylene ether-sulfone) comprises units of the formula (3), (4), (5), or (6) or a combination comprising at least one of the foregoing units.

Embodiment 5

The composition of any one of embodiments 1 to 4, wherein the poly(carbonate-siloxane) comprises bisphenol carbonate units of formula (7) wherein R$^a$ and R$^b$ are each independently C$_{1-12}$ alkyl, C$_{1-12}$ alkenyl, C$_{3-8}$ cycloalkyl, or C$_{1-12}$ alkoxy, p and q are each independently 0 to 4, and X$^a$ is a single bond, —O—, —S—, —S(O)—, —S(O)$_2$—, —C(O)—, a C$_{1-11}$ alkylidene of formula —C(R$^c$)(R$^d$)— wherein R$^c$ and R$^d$ are each independently hydrogen or C$_{1-10}$ alkyl, or a group of the formula —C(=R$^e$)— wherein R$^e$ is a divalent C$_{1-10}$ hydrocarbon group; and polysiloxane units of the formula (10) wherein R is each independently a C$_{1-13}$ monovalent hydrocarbon group, and E has an average value of 2 to 200.

Embodiment 6

The composition of embodiment 5, wherein the siloxane units are of the formulas (10b-2), (10b-3), (10b-4), or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane).

Embodiment 7

The composition of any one of embodiments 1 to 6, wherein the poly(carbonate-arylate ester) comprising bisphenol A carbonate units and arylate ester units of the formula (11a) wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group.

Embodiment 8

The composition of embodiment 7, wherein the poly(carbonate-arylate ester) is a poly(bisphenol A carbonate)-co-(bisphenol phthalate ester) comprising 55-65 wt. % of the ester units, wherein the ester units have a molar ratio of isophthalate to terephthalate of 45:55-55:45 or the poly(carbonate-arylate ester) is a poly(bisphenol A carbonate)-co-(bisphenol phthalate ester) comprising 75-85 wt. % of the ester units, the ester units having a molar ratio of isophthalate to terephthalate of 98:2-88:12.

Embodiment 9

The composition of any one of embodiments 1 to 6, wherein the poly(carbonate-arylate ester) comprises bisphenol A carbonate units, arylate ester units of the formula (11b), optionally, monoaryl carbonate units of the formula (14), and optionally, bisphenol ester units of the formula (11a), wherein, in the foregoing formulas $R^h$ is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group.

Embodiment 10

The composition of embodiment 9, wherein the poly(carbonate-arylate ester) comprises 70 to 90 mol % of bisphenol A carbonate units, 10 to 30 mol % of isophthalic acid-terephthalic acid-resorcinol ester units, and optionally, 1 to 60 mol % resorcinol carbonate units, isophthalic acid-terephthalic acid-bisphenol A ester units, or a combination thereof.

Embodiment 11

The composition of any one of embodiments 1 to 10, wherein the poly(carbonate-arylate ester-siloxane) comprises repeating carbonate units of the formula (7) wherein $R^a$ and $R^b$ are each independently are each independently $C_{1-12}$ alkyl, p and q are each independently integers of 0 to 4, and $X^a$ is a single bond, —O—, —S—, —S(O)—, —S(O)$_2$—, —C(O)—, or a $C_{1-18}$ organic group; and arylate ester units of the formula (11b) wherein $R^h$ is each independently a halogen or $C_{1-10}$ hydrocarbon group, and n is 0 to 4; and siloxane units of the formula (10) wherein each R is independently a $C_{1-13}$ monovalent hydrocarbon group, and E has an average value of 2 to 500.

Embodiment 12

The composition of embodiment 11, wherein in the poly(carbonate-arylate ester-siloxane), the carbonate units are bisphenol A carbonate units; the arylate ester units are isophthalic acid-terephthalic acid-resorcinol units; and the siloxane units are of the formulas (10b-2), (10b-3), (10b-4), or a combination comprising at least one of the foregoing, wherein E has an average value of 5 to 30.

Embodiment 13

The composition of embodiment 11 or 12, wherein the poly(carbonate-arylate ester-siloxane) comprises 1 to 40 mol % of the bisphenol A carbonate units, 50 to 95 mol % of isophthalic acid-terephthalic acid-resorcinol units, and the siloxane units in an amount effective to provide 0.1 to 10 wt % of siloxane units, based on the weight of the poly(carbonate-ester-siloxane).

Embodiment 14

The composition of any one of embodiments 1 to 13, further comprising a processing aid, a heat stabilizer, an ultraviolet light absorber, a colorant, a flame retardant, or a combination comprising at least one of the foregoing.

Embodiment 15

The composition of embodiment 1, comprising, based on the weight of the composition: 10 to 25 wt. % or 15 to 25 wt. % of a polyphenylene sulfone comprising the units of the formula (4); 35 to 42 wt. % of a poly(bisphenol-A carbonate) homopolymer; 35 to 42 wt. % of a poly(carbonate-siloxane); and optionally, up to 5 wt. % of an additive selected from a processing aid, a heat stabilizer, an ultraviolet light absorber, a colorant, a flame retardant, or a combination comprising at least one of the foregoing, wherein the poly(carbonate-siloxane) comprises bisphenol A carbonate units, and siloxane units of the formulas (10b-2), (10b-3), (10b-4), or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane), wherein a sample of the composition has a notched Izod impact value of greater than or equal to 60 kJ/m$^2$, measured at 23° C. according to ISO 180/1A using multipurpose 3.0 mm test specimen in accordance with ISO 3167 TYPE A.

Embodiment 16

The composition of embodiment 1, comprising, based on the weight of the composition: 5 to 30 wt. %, 10 to 30 wt. %, or 20 to 30 wt. % of a polyphenylene sulfone comprising the units of the formula (4); 50 to 80 wt. %, 50 to 70 wt. %, or 50 to 60 wt. % of a poly(carbonate-siloxane); 10 to 20 wt. % or 15 to 20 wt. % of a poly(carbonate-arylate ester); and optionally, up to 5 wt. % of an additive selected from a processing aid, a heat stabilizer, an ultraviolet light absorber, a colorant, a flame retardant, or a combination comprising at least one of the foregoing, wherein the poly(carbonate-siloxane) comprises bisphenol A carbonate units, and siloxane units of the formulas (10b-2), (10b-3), (10b-4), or a combination comprising at least one of the foregoing, wherein E has an average value of 2 to 200, wherein the poly(carbonate-siloxane) comprises 0.5 to 55 wt. % of dimethylsiloxane units based on the total weight of the poly(carbonate-siloxane), wherein the poly(carbonate-arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45, or a poly(bisphenol A carbonate)-co-(bisphenol phthalate ester) comprising 75 to 85 wt. % of the ester units, wherein the ester units have a molar ratio of isophthalate to terephthalate of 98:2 to 88:12, or a combination thereof, and wherein a sample of the composition has a notched Izod impact value of greater than or equal to 40 kJ/m$^2$, measured at 23° C. according to ISO 180/1A using multipurpose 3.0 mm test specimen in accordance with ISO 3167 TYPE A.

Embodiment 17

The composition of embodiment 1, comprising, based on the weight of the composition: 5 to 30 wt. %, 10 to 30 wt. %, or 20 to 30 wt. % of a polyphenylene sulfone comprising the units of the formula (4); 50 to 80 wt. % 50 to 70 wt. %, or 50 to 60 wt. % of a poly(carbonate-siloxane); 10 to 20 wt. % or 15 to 20 wt. % of a poly(carbonate-arylate ester-siloxane); and optionally, up to 5 wt. % of an additive selected from a processing aid, a heat stabilizer, an ultraviolet light absorber, a colorant, a flame retardant, or a combination comprising at least one of the foregoing, wherein the poly(carbonate-siloxane) comprises bisphenol A carbonate units, and siloxane units of the formulas (10b-2), (10b-3), (10b-4), or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane), wherein poly(carbonate-arylate ester-siloxane) comprises bisphenol A carbonate units; isophthalic acid-terephthalic acid-resorcinol units; and siloxane units of the formulas (10b-2), (10b-3), (10b-4), or a combination comprising at least one of the foregoing, wherein E has an average value of 5 to 30, and wherein a sample of the composition has a notched Izod impact value of greater than or equal to 40 kJ/m$^2$, measured at 23° C. according to ISO 180/1A using multipurpose 3.0 mm test specimen in accordance with ISO 3167 TYPE A.

Embodiment 18

An article selected from a molded article, a thermoformed article, an extruded film, an extruded sheet, a honeycomb structure, a foamed article, one or more layers of a multilayer article, a substrate for a coated article, and a substrate for a metallized article comprising the composition of any one of embodiments 1 to 17.

Embodiment 19

The article of embodiment 18, wherein the article is a component of a consumer electronic device selected from a gaming console, a gaming controller, a portable gaming device, a cellular telephone, a television, a personal computer, a tablet computer, a laptop computer, a personal digital assistant, a portable media player, a, a digital camera, a portable music player, an appliance, a power tool, a robot, a toy, a greeting card, a home entertainment system, and active loudspeaker, or a soundbar or a train or aircraft interior component selected from a partition, a room divider, a seat back, a food tray, a trim panel, an interior display panel, an interior wall, a side wall, an end wall, a ceiling panel, a door lining, a flap, a box, a hood, a louver, an insulation material, a handle, a body shell for a window, a window frame, an enclosure for an electronic device, a door, a luggage rack, a luggage container, an interior side of a gangway membrane, an interior lining of a gangway, or a component of a luggage compartment, a display unit, a television, a refrigerator door, a tray table, a food cart, a magazine rack, an air flow regulator, a door, a table, or a seat.

Embodiment 20

A method of manufacture of an article, comprising molding, extruding, or casting the composition of any one of embodiments 1 to 17 to form the article.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Unless otherwise indicated, exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising, based on the total weight of the thermoplastic composition,
   5 to 30 wt. % of a poly(arylene ether-sulfone); and
   50 to 95 wt. % of a poly(carbonate-siloxane) consisting of carbonate units and siloxane units, and optionally a polycarbonate homopolymer;
   optionally, 0.5 to 25 wt. % of a poly(etherimide);
   wherein a sample of the composition has
   a notched Izod impact value of greater than or equal to 30 kJ/m², measured at 23° C. according to ISO 180/1A using multipurpose 3.0 mm test specimen in accordance with ISO 3167 TYPE A;
   a tensile yield strength retention of 80% and higher after exposure of an ISO tensile bar for 24 hours to sunscreen under 0.5% strain compared to a non-exposed reference tested according to ISO 527; and
   an elongation at break retention of 80% and higher after exposure of an ISO tensile bar for 24 hours to sunscreen under 0.5% strain compared to a non-exposed reference tested according to ISO 527.

2. The composition of claim 1, comprising, based on the total weight of the composition:
   5 to 30 wt. % of the poly(arylene ether-sulfone);
   50 to 95 wt. % of the polycarbonate component comprising the poly(carbonate-siloxane) and optionally the polycarbonate homopolymer; and
   0.5 to 25 wt. % of a poly(carbonate-arylate ester) compatibilizer, a poly(carbonate-arylate ester-siloxane) compatibilizer, or a combination comprising at least one of the foregoing.

3. The composition of claim 2, wherein the composition comprises the poly(carbonate-arylate ester) compatibilizer, the poly(carbonate-arylate ester) compatibilizer comprising bisphenol A carbonate units and arylate ester units of the formula

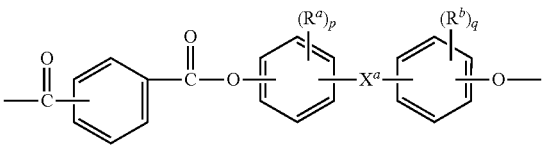

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently 0 to 4, and
$X^a$ is a single bond, —O—, —S—, —S(O)—, —S(O)$_2$—, —C(O)—, a $C_{1-11}$ alkylidene of the formula C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group.

4. The composition of claim 3, wherein
the poly(carbonate-arylate ester) compatibilizer is a poly(bisphenol A carbonate)-co-(bisphenol phthalate ester) comprising 55 to 65 wt. % of the ester units, wherein the ester units have a molar ratio of isophthalate to terephthalate of 45:55 to 55:45 or
the poly(carbonate-arylate ester) is a poly(bisphenol A carbonate)-co-(bisphenol phthalate ester) comprising 75 to 85 wt. % of the ester units, wherein the ester units have a molar ratio of isophthalate to terephthalate of 98:2 to 88:12.

5. The composition of claim 2, wherein the composition comprises the poly(carbonate-arylate ester) compatibilizer, and the poly(carbonate-arylate ester) compatibilizer comprises bisphenol A carbonate units, arylate ester units of the formula

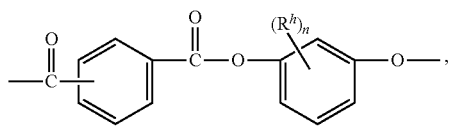

optionally, monoaryl carbonate units of the formula

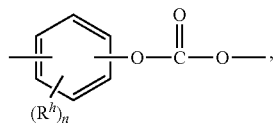

and
optionally, bisphenol ester units of the formula

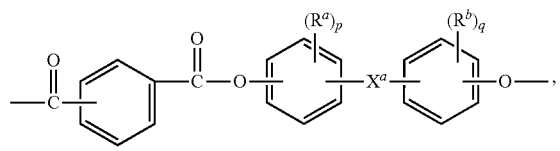

wherein, in the foregoing formulas
$R^h$ is each independently a $C_{1-10}$ hydrocarbon group,
n is 0 to 4,
$R^a$ and $R^b$ are each independently a $C_{1-12}$ alkyl,
p and q are each independently integers of 0 to 4, and
$X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group.

6. The composition of claim 5, wherein the poly(carbonate-arylate ester) compatibilizer comprises
70 to 90 mol % of bisphenol A carbonate units,
10 to 30 mol % of isophthalic acid-terephthalic acid-resorcinol ester units, and
optionally, 1 to 60 mol % resorcinol carbonate units, isophthalic acid-terephthalic acid-bisphenol A ester units, or a combination thereof.

7. The composition of claim 2,
wherein the poly(carbonate-arylate ester-siloxane) compatibilizer comprises repeating carbonate units of the formula

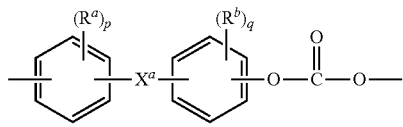

wherein
$R^a$ and $R^b$ are each independently are each independently $C_{1-12}$ alkyl,
p and q are each independently integers of 0 to 4, and
$X^a$ is a single bond, —O—, —S—, —S(O)—, —S(O)$_2$—, —C(O)—, or a $C_{1-18}$ organic group and arylate ester units of the formula

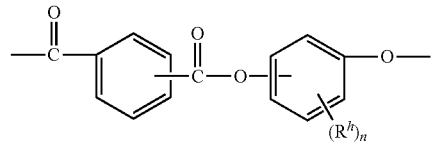

wherein
$R^h$ is each independently a halogen or $C_{1-10}$ hydrocarbon group, and
n is 0 to 4; and
siloxane units of the formula

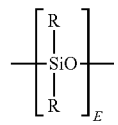

wherein
each R is independently a $C_{1-13}$ monovalent hydrocarbon group, and
E has an average value of 2 to 500.

8. The composition of claim 7, wherein in the poly(carbonate-arylate ester-siloxane) compatibilizer,
the carbonate units are bisphenol A carbonate units;
the arylate ester units are isophthalic acid-terephthalic acid-resorcinol units; and
the siloxane units are of the formula

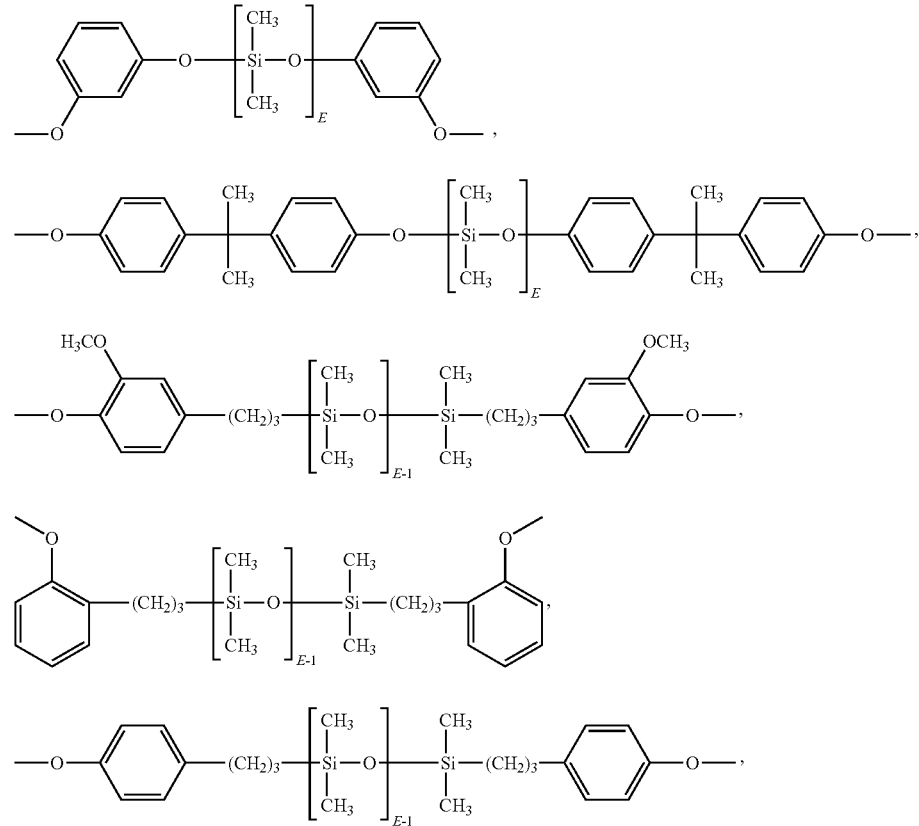

or a combination comprising at least one of the foregoing, wherein E has an average value of 5 to 30.

9. The composition of claim 7, wherein the poly(carbonate-arylate ester-siloxane) compatibilizer comprises
1 to 40 mol % of the bisphenol A carbonate units,
50 to 95 mol % of isophthalic acid-terephthalic acid-resorcinol units, and
the siloxane units in an amount effective to provide 0.1 to 10 wt % of siloxane units, based on the weight of the poly(carbonate-ester-siloxane).

10. The composition of claim 7, comprising, based on the weight of the composition:
5 to 30 wt. % of the polyphenylene sulfone comprising the units of the formula

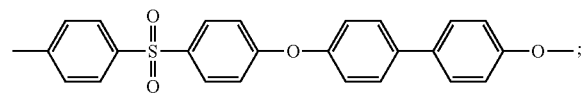

50 to 80 wt. % of the poly(carbonate-siloxane);
10 to 20 wt. % of the poly(carbonate-arylate ester-siloxane) compatibilizer; and
optionally, up to 5 wt. % of an additive selected from a processing aid, a heat stabilizer, an ultraviolet light absorber, a colorant, a flame retardant, or a combination comprising at least one of the foregoing,
wherein the poly(carbonate-siloxane) comprises
bisphenol A carbonate units, and
siloxane units of the formula

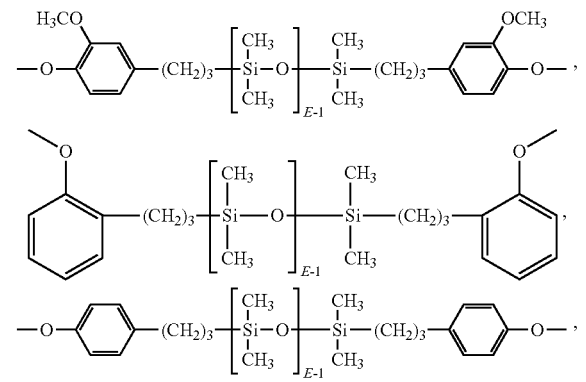

or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane),
wherein poly(carbonate-arylate ester-siloxane) compatibilizer comprises bisphenol A carbonate units; isophthalic acid-terephthalic acid-resorcinol units; and siloxane units of the formula

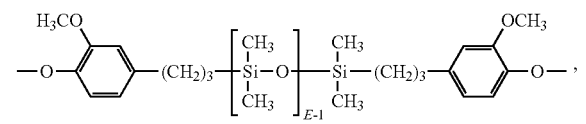

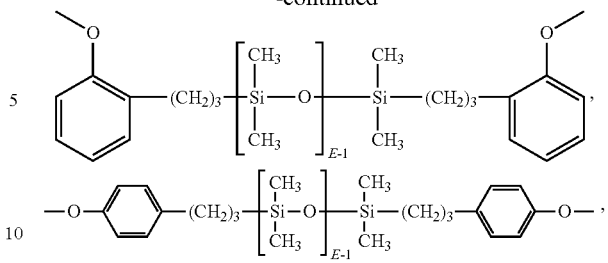

or a combination comprising at least one of the foregoing, wherein E has an average value of 5 to 30, and
wherein a sample of the composition has
a notched Izod impact value of greater than or equal to 40 kJ/m$^2$, measured at 23° C. according to ISO 180/1A using multipurpose 3.0 mm test specimen in accordance with ISO 3167 TYPE A.

11. The composition of claim 1, wherein the poly(arylene ether-sulfone) is of the formula —[Ar$^1$—SO$_2$—Ar$^2$—O]$_t$—[Ar$^3$—O]$_s$— wherein t is greater than 1, and s is 0 or greater than one, and each Ar$^1$, Ar$^2$, and Ar$^3$ is the same or different, and is a group of formula

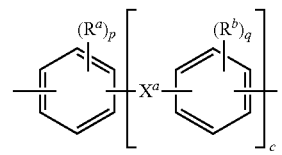

wherein
c is 0 or 1,
R$^a$ and R$^b$ are each independently a linear or branched C$_{1-10}$ alkyl, linear or branched C$_{2-10}$ alkenyl, linear or branched C$_{2-10}$ alkynyl, C$_{6-18}$ aryl, C$_{7-20}$ alkylaryl, C$_{7-20}$ arylalkyl, C$_{5-10}$ cycloalkyl, C$_{5-20}$ cycloalkenyl, linear or branched C$_{1-10}$ alkylcarbonyl, C$_{6-18}$ arylcarbonyl, halogen, nitro, cyano, a halogen, C$_{1-12}$ alkoxy, or C$_{1-12}$ alkyl,
p and q are each independently integers of 0 to 4, and
X$^a$ is a single bond, —O—, —S—, —S(O)—, —S(O)$_2$—, —C(O)—, or a C$_{1-18}$ organic group.

12. The composition of claim 11, wherein the poly(arylene ether-sulfone) comprises units of the formula

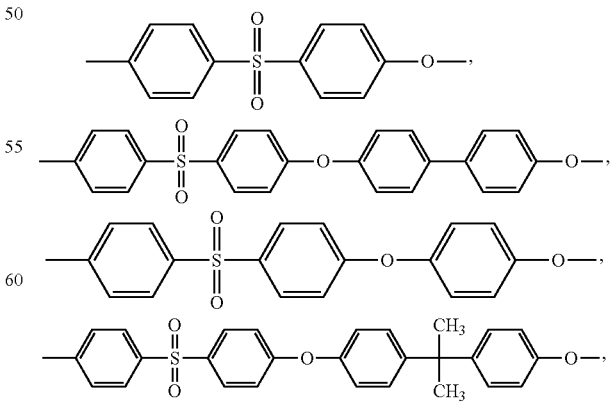

or a combination comprising at least one of the foregoing units.

13. The composition of claim 1, wherein the poly(carbonate-siloxane) comprises
bisphenol carbonate units of the formula

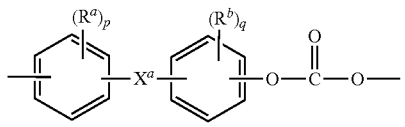

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently 0 to 4, and
$X^a$ is a single bond, —O—, —S—, —S(O)—, —S(O)$_2$—, —C(O)—, a $C_{1-11}$ alkylidene of formula C($R^c$)($R^d$) wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and
polysiloxane units of the formula

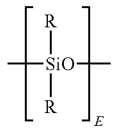

wherein
R is each independently a $C_{1-13}$ monovalent hydrocarbon group, and
E has an average value of 2 to 200.

14. The composition of claim 13, wherein the siloxane units are of the formula

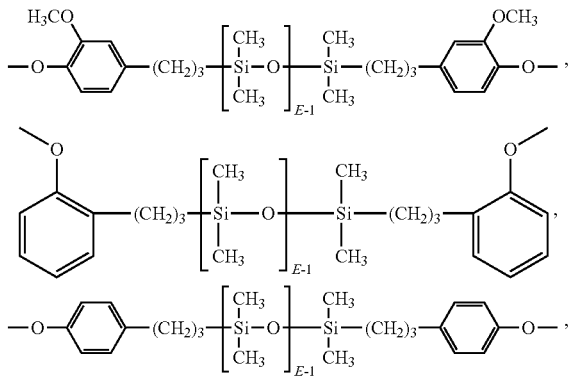

or a combination comprising at least one of the foregoing, wherein E has an average value of 2 to 200, wherein the poly(carbonate-siloxane) comprises 0.5 to 55 wt. % of siloxane units based on the total weight of the poly(carbonate-siloxane).

15. The composition of claim 1, further comprising an additive selected from a processing aid, a heat stabilizer, an ultraviolet light absorber, a colorant, a flame retardant, or a combination comprising at least one of the foregoing.

16. An article selected from a molded article, a thermoformed article, an extruded film, an extruded sheet, a honeycomb structure, a foamed article, one or more layers of a multi-layer article, a substrate for a coated article, and a substrate for a metallized article comprising the composition of claim 1.

17. The article of claim 16, wherein the article is a component of
a consumer electronic device selected from a gaming console, a gaming controller, a portable gaming device, a cellular telephone, a television, a personal computer, a tablet computer, a laptop computer, a personal digital assistant, a portable media player, a, a digital camera, a portable music player, an appliance, a power tool, a robot, a toy, a greeting card, a home entertainment system, and active loudspeaker, or a soundbar or
a train or aircraft interior component selected from a partition, a room divider, a seat back, a food tray, a trim panel, an interior display panel, an interior wall, a side wall, an end wall, a ceiling panel, a door lining, a flap, a box, a hood, a louver, an insulation material, a handle, a body shell for a window, a window frame, an enclosure for an electronic device, a door, a luggage rack, a luggage container, an interior side of a gangway membrane, an interior lining of a gangway, or a component of a luggage compartment, a display unit, a television, a refrigerator door, a tray table, a food cart, a magazine rack, an air flow regulator, a door, a table, or a seat.

18. A method of manufacture of an article, comprising molding, extruding, or casting the composition of claim 1 to form the article.

19. A thermoplastic composition, comprising, based on the weight of the composition:
10 to 25 wt. % of a polyphenylene sulfone comprising the units of the formula

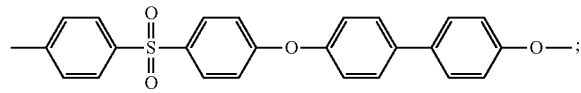

35 to 42 wt. % of a poly(bisphenol-A carbonate) homopolymer;
35 to 42 wt. % of a poly(carbonate-siloxane); and
optionally, up to 5 wt. % of an additive selected from a processing aid, a heat stabilizer, an ultraviolet light absorber, a colorant, a flame retardant, or a combination comprising at least one of the foregoing,
wherein the poly(carbonate-siloxane) comprises
bisphenol A carbonate units, and
siloxane units of the formula

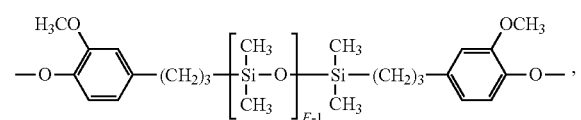

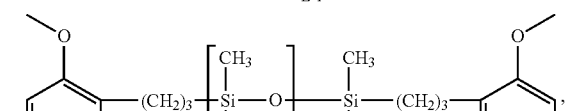

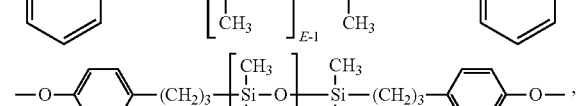

or a combination comprising at least one of the foregoing, wherein E has an average value of 2 to 200, wherein the poly(carbonate-siloxane) comprises 0.5 to 55 wt. % of siloxane units based on the total weight of the poly (carbonate-siloxane), wherein a sample of the composition has a notched Izod impact value of greater than or equal to 60 kJ/m², measured at 23° C. according to ISO 180/1A using multipurpose 3.0 mm test specimen in accordance with ISO 3167 TYPE A;

a tensile yield strength retention of 80% and higher after exposure of an ISO tensile bar for 24 hours to sunscreen under 0.5% strain compared to a non-exposed reference tested according to ISO 527; and an elongation at break retention of 80% and higher after exposure of an ISO tensile bar for 24 hours to sunscreen under 0.5% strain compared to a non-exposed reference tested according to ISO 527.

20. A thermoplastic composition, comprising, based on the weight of the composition:

5 to 30 wt. % of a polyphenylene sulfone comprising the units of the formula

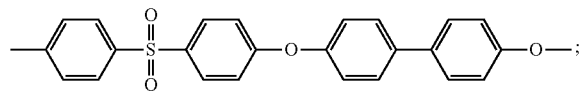

50 to 80 wt. % of a poly(carbonate-siloxane);
10 to 20 wt. % of a poly(carbonate-arylate ester); and
optionally, up to 5 wt. % of an additive selected from a processing aid, a heat stabilizer, an ultraviolet light absorber, a colorant, a flame retardant, or a combination comprising at least one of the foregoing, wherein the poly(carbonate-siloxane) comprises
bisphenol A carbonate units, and
siloxane units of the formula

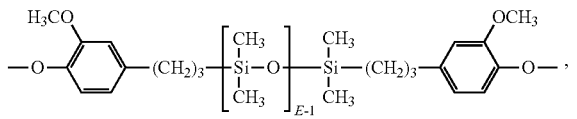

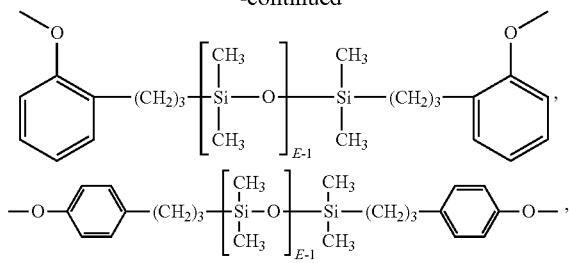

or a combination comprising at least one of the foregoing, wherein E has an average value of 2 to 200, wherein the poly(carbonate-siloxane) comprises 0.5 to 55 wt. % of dimethylsiloxane units based on the total weight of the poly(carbonate-siloxane), wherein the poly(carbonate-arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45, or a poly(bisphenol A carbonate)-co-(bisphenol phthalate ester) comprising 75 to 85 wt. % of the ester units, wherein the ester units have a molar ratio of isophthalate to terephthalate of 98:2 to 88:12, or a combination thereof, and wherein a sample of the composition has a notched Izod impact value of greater than or equal to 40 kJ/m², measured at 23° C. according to ISO 180/1A using multipurpose 3.0 mm test specimen in accordance with ISO 3167 TYPE A;

a tensile yield strength retention of 80% and higher after exposure of an ISO tensile bar for 24 hours to sunscreen under 0.5% strain compared to a non-exposed reference tested according to ISO 527; and an elongation at break retention of 80% and higher after exposure of an ISO tensile bar for 24 hours to sunscreen under 0.5% strain compared to a non-exposed reference tested according to ISO 527.

* * * * *